United States Patent [19]
Guthrie et al.

[11] Patent Number: 5,905,877
[45] Date of Patent: May 18, 1999

[54] PCI HOST BRIDGE MULTI-PRIORITY FAIRNESS ARBITER

[75] Inventors: Guy Lynn Guthrie, Austin; Kenneth Alan Riek, Round Rock, both of Tex.

[73] Assignee: International Business Machines Corporation, Armonk, N.Y.

[21] Appl. No.: 08/853,776

[22] Filed: May 9, 1997

[51] Int. Cl.$^6$ .................................................. G06F 13/14
[52] U.S. Cl. .......................... 395/292; 395/728; 395/287; 370/462
[58] Field of Search .................................. 395/292, 287, 395/293, 728, 729; 370/447, 462

[56] References Cited

U.S. PATENT DOCUMENTS

| | | | |
|---|---|---|---|
| 4,897,833 | 1/1990 | Kent et al. ................................ | 370/447 |
| 5,150,466 | 9/1992 | Barlow et al. ........................... | 395/302 |
| 5,301,279 | 4/1994 | Riley et al. .............................. | 395/861 |
| 5,369,748 | 11/1994 | McFarland et al. ..................... | 395/306 |
| 5,396,602 | 3/1995 | Amini et al. ............................. | 395/293 |
| 5,471,590 | 11/1995 | Melo et al. ............................... | 395/288 |
| 5,490,551 | 2/1996 | Prakash et al. .......................... | 152/556 |
| 5,533,204 | 7/1996 | Tipley ...................................... | 395/288 |
| 5,535,341 | 7/1996 | Shah et al. ............................... | 395/306 |
| 5,555,383 | 9/1996 | Elazar et al. ............................. | 395/306 |
| 5,555,430 | 9/1996 | Gephardt et al. .................. | 395/800.16 |
| 5,588,125 | 12/1996 | Bennett .................................... | 395/306 |
| 5,768,626 | 6/1998 | Munson et al. .......................... | 395/877 |

OTHER PUBLICATIONS

IBM Technical Disclosure Bulletin, "Method for Adding Request/Grant Pairs to a Fixed Peripheral Component Interconnect Arbiter," vol. 39, No. 7, Jul. 1996.

IBM Technical Disclosure Bulletin, "Arbitration for a PowerPC CPU Bus/PCI Bus System," vol. 38, No. 05, May 1995.

IBM Technical Disclosure Bulletin, "Real–Time Self–Granting, Centrally Directed Distributed Arbitration With Fairness," vol. 38, No. 03, Mar. 1995.

*Primary Examiner*—Gopal C. Ray
*Attorney, Agent, or Firm*—Volel Emile; Jack V. Musgrove; Andrew J. Dillon

[57] ABSTRACT

A method and system for allowing one or more attached devices to access a computer bus. The objects of the method and system are achieved as is now described. At some particular instant in time, prioritized queues are loaded with one or more requests for access from one or more devices whose assigned priority levels correspond to the priority of the queue into which the requests for access are loaded. Requests for access, which are resident within a current queue, are preferentially granted in a sequential fashion until the current queue is emptied, after which at least one request for access from a lower in priority queue relative to the current queue is granted before responding to other requests for access, such that at least one request for access is periodically granted from a lower in priority queue relative to the current queue.

29 Claims, 9 Drawing Sheets

PCI HOST BRIDGE MULTI-PRIORITY FAIRNESS ARBITER

BACKGROUND OF THE INVENTION

1. Technical Field

The present invention relates to an improved method and system for allowing attached devices to access a computer bus. In particular, the present invention relates to an improved method and system for allowing attached devices to access a computer bus, where such access is granted based upon priority levels assigned to the attached devices. Yet still more particularly, the present invention relates to an improved method and system for allowing attached devices to access a computer bus, where such access is granted based upon priority levels assigned to the attached devices, but where such access is granted in such a fashion that lower priority requests are granted in a fair and consistent manner.

2. Description of the Related Art

The present invention is related to a more efficient way to utilize a computer data bus. A computer data bus generally consists of a set of hardware lines—wires—used for data transfer among the components of a computer system. A computer data bus is essentially a shared highway that connects different parts of the system-including the microprocessor, disk-drive controller, memory, and input/output ports and enables them to transfer information. Buses are characterized by the number of bits they can transfer at a single time (e.g., an 8-bit data bus transfers 8 bits of data in parallel at a time; a 16-bit data bus transfers 16 bits in parallel at a time). The bus is integral to internal data transfer. Bus (computer), Microsoft® Encarta® 96 Encyclopedia.© 1993–1995 Microsoft Corporation. All rights reserved.

A computer bus is an amalgam of different types of "pure" communication links. Accordingly, prior to discussing a computer data bus it is useful to first discuss generally data communications links.

There are three characteristics that distinguish various data communication links: topology, duplexity, and line discipline. The topology of a data link refers to the logical-physical arrangement of stations on a link (e.g., a point-to-point topology (only two stations on the link), or a multi-point topology (more than two stations on the link). The duplexity of a link refers to the direction and timing of signal flow (e.g., a half-duplex link is similar to a one-lane, two-way bridge, in that stations on a half-duplex link can transmit and receive, but not simultaneously; a full-duplex link is similar to a two-way, two-lane bridge in that two stations can simultaneously send and receive data to and from each other).

Line discipline refers to who can talk when: a station should only transmit when it knows the physical transmission path is clear and when it knows the receiver is prepared to receive. Line discipline varies dependent upon the topology and duplexity of a link (e.g. a half-duplex, multi-point link of bus topology will require more discipline than a full-duplex, point-to-point link). Line discipline usually has three distinct phases: establishment of access to a link; data transfer over the link; and termination of the logical link between transmitter and receiver, which includes relinquishment of access to the link.

A computer bus is an amalgam of the foregoing described "pure" communication links. The computer bus itself is a multi-point half-duplex link of bus topology. That is, a collection of devices all attached to the same transmission medium. Such link requires a great amount of line discipline, since only one device at a time can "transmit over the link." This line discipline for the computer bus is provided by a second data communications link: a point-to-point full-duplex link of hub topology. The following figure will make this more clear.

FIG. 1 illustrates a computer bus. Shown is computer bus 100 to which a number of devices (e.g., device 102, device 104, device 106, device 108, and device 110) are connected. As is illustrated, computer bus 100 is a half-duplex link of bus topology, so only one of the attached devices can be transmitting over the link (computer bus 100) at any one time. Thus, access to the link must be controlled (i.e., there must be some form of line discipline).

The line discipline is provided by a second data communications link of hub topology formed between the attached devices (e.g., device 102, device 104, device 106, device 108, and device 110) and link access control station 112. The second data communications link of hub topology is composed of multiple point-to-point component links. These component links connect the attached devices (e.g., device 102, device 104, device 106, device 108, and device 110) to link access control station 112 and, as is illustrated in FIG. 1, are full-duplex in that there is one line over which each device (e.g., device 102, device 104, device 106, etc.) can send a request for access to the computer data bus (denoted in FIG. 1 as the request bus access (REQ) lines), and in that there is another line over which link access control station 112 can reply to a requesting device that access to computer bus 100 has been granted (denoted in FIG. 1 as the bus access request granted (GNT) lines).

It is common to assign priorities to the differing devices connected to computer bus 100. For example, device 102 and device 106 could be assigned high priority, device 104 medium priority, and device 108 low priority. If link access control station 112 receives a request from high, medium, and low priority devices, then link access control station 112 allows bus access to the high priority devices first, the medium priority devices second, and the low priority devices last. Differing requests for access to computer bus 100 from devices with the same priority are generally granted in same prespecified order.

As an example of how a computer bus operates, assume device 102, device 106, and device 108 wish access to computer bus 100. Accordingly, device 102, device 106, and device 108 all activate and hold their respective request bus access (REQ) signals. Link access control station 112 notices that these respective request bus access (REQ) signals have been activated. In response, link access control station 112 prioritizes the requests dependent upon priorities previously assigned to the devices. Assume for the sake of illustration that device 106 has been assigned a highest priority, device 102 has been assigned a medium priority, and device 108 has been assigned a lowest priority. Accordingly, link access control station 112 determines that when computer bus 100 is free, device 106 (the highest priority requesting device) will be given access to computer bus 100.

When link access control station 112 determines that computer bus 100 is free, link access control station 112 activates and holds device 106's bus access request granted (GNT) signal. Device 106 now knows that it is free to transmit over computer bus 100. When link access control station 112 determines that the requesting device 106 should relinquish control of computer bus 100, link access control station 112 deactivates device 106's request granted signal (GNT), which tells device 106 that when it completes its current operation, it should no longer transmit over computer bus 100.

Subsequent to detecting that its bus access request granted (GNT) signal has been deactivated, device 106 completes any computer bus 100 transmission that it is currently engaged in and then deactivates its request bus access signal (REQ). Once link access control station 112 notes that device 106 has deactivated its request access signal, link access control station 112 knows computer bus 100 is free. Consequently, link access control station 112 issues another bus access request granted (GNT) signal to the highest priority device that is now requesting access to computer bus 100.

If no other devices are requesting access, device 102 (medium priority) will be granted access to the bus. However, if in the interim (i.e., while device 106 was accessing the bus) another highest priority device requested access, then link access control device 112 will grant access to that highest priority device and both device 102 (medium priority) and device 108 (lowest priority) will have to continue to wait.

The problem with the foregoing is that if link access control station 112 keeps receiving requests from highest priority devices, it is completely possible that requests from both the medium and the lowest priority devices could be completely starved out, or could be delayed for a great amount of time. It is clear that a need exists for a method and system which will allow the lower priority devices access to the bus.

However, any solution to such a need must recognize that the priority system exists for a reason: there are devices which need to be given priority access to computer bus 100. On the other hand, it is important that the lower priority requests to the bus be granted, because while these requests are lower in priority they are still essential for the overall functioning of the computing system utilizing computer bus 100.

In light of the foregoing it clear that a need exists for a method and system which will allow attached devices to access a computer bus, and where such access is granted based upon priorities assigned to the attached devices, but where such access is granted in such a fashion that lower priority requests are granted in a fair and consistent manner.

SUMMARY OF THE INVENTION

It is therefore one object of the present invention to provide an improved method and system for allowing attached devices to access a computer bus.

It is therefore another object of the present invention to provide an improved method and system for allowing attached devices to access a computer bus, where such access is granted based upon priority levels assigned to the attached devices.

It is yet another object of the present invention to provide an improved method and system for allowing attached devices to access a computer bus, where such access is granted based upon priority levels assigned to the attached devices, but where such access is granted in such a fashion that lower priority requests are granted in a fair and consistent manner.

The foregoing objects are achieved as is now described. At some particular instant in time, prioritized queues are loaded with one or more requests for access from one or more devices whose assigned priority levels correspond to the priority of the queue into which the requests for access are loaded. Requests for access, which are resident within a current queue, are preferentially granted in a sequential fashion until the current queue is emptied, after which at least one request for access from a lower in priority queue relative to the current queue is granted before responding to other requests for access, such that at least one request for access is periodically granted from a lower in priority queue relative to the current queue.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

The preferred embodiment of the present invention is implemented via a PCI bus. A PCI bus is fundamentally the same as the general computer bus which was illustrated in FIG. 1.

PCI stands for Peripheral Component Interconnect local bus. It is derived from a specification introduced by Intel Corporation that defines a local bus system for a computer built into the PCI specification. The PCI local bus allows PCI-compliant expansion cards to be installed in the computer. A PCI local bus system requires the presence of a PCI controller card, which must be installed in one of the PCI-compliant slots. The PCI controller can exchange data with the system's CPU either 32 bits or 64 bits at a time, depending on the implementation, and it allows intelligent, PCI-compliant adapters to perform tasks concurrently with the CPU using a technique called bus mastering. The PCI specification allows for multiplexing. *Microsoft Press Computer Dictionary* 295 (2ed. 1994).

Figure 1:
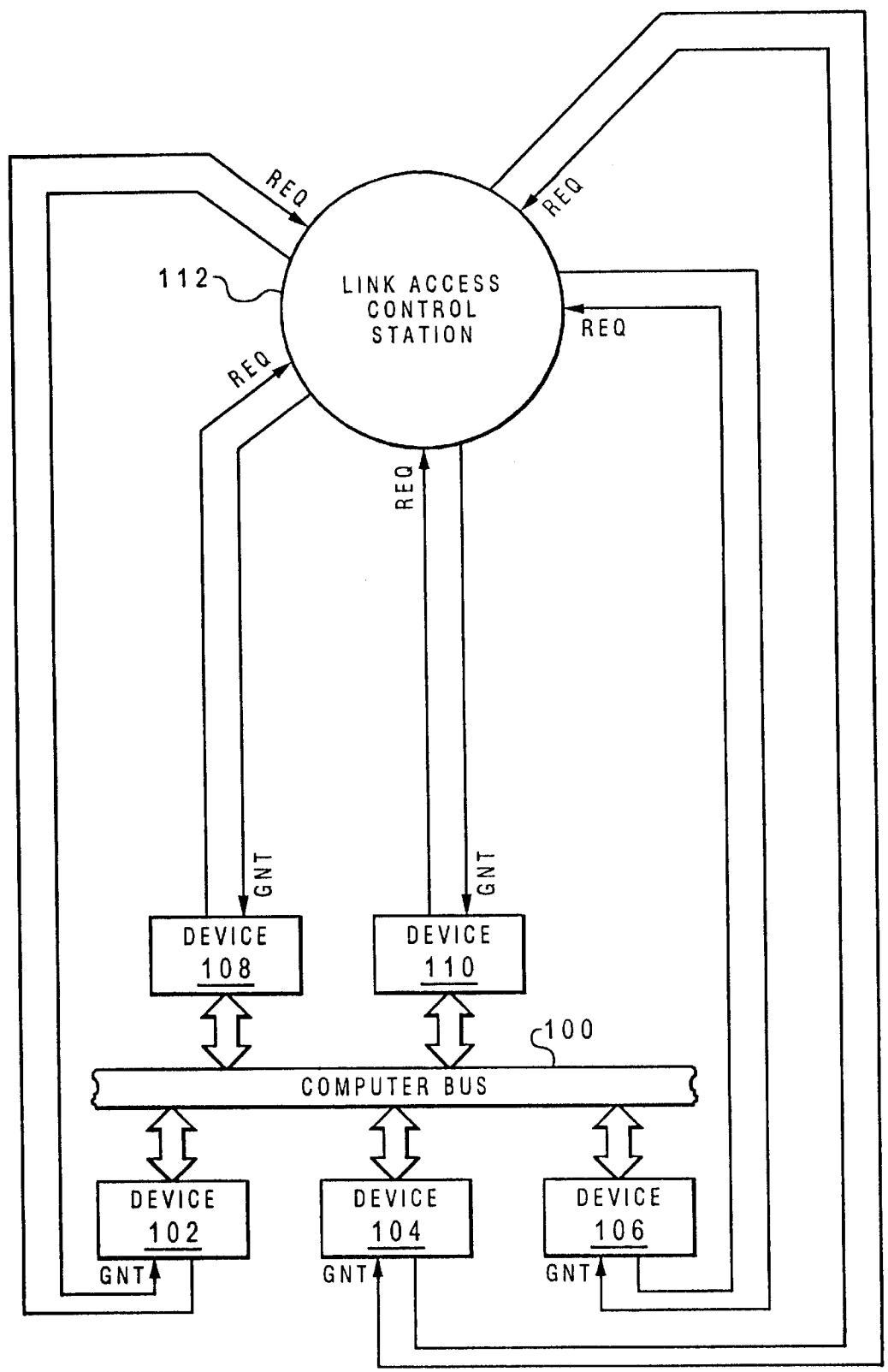
FIG. 1 illustrates a computer bus.
Figure 2:
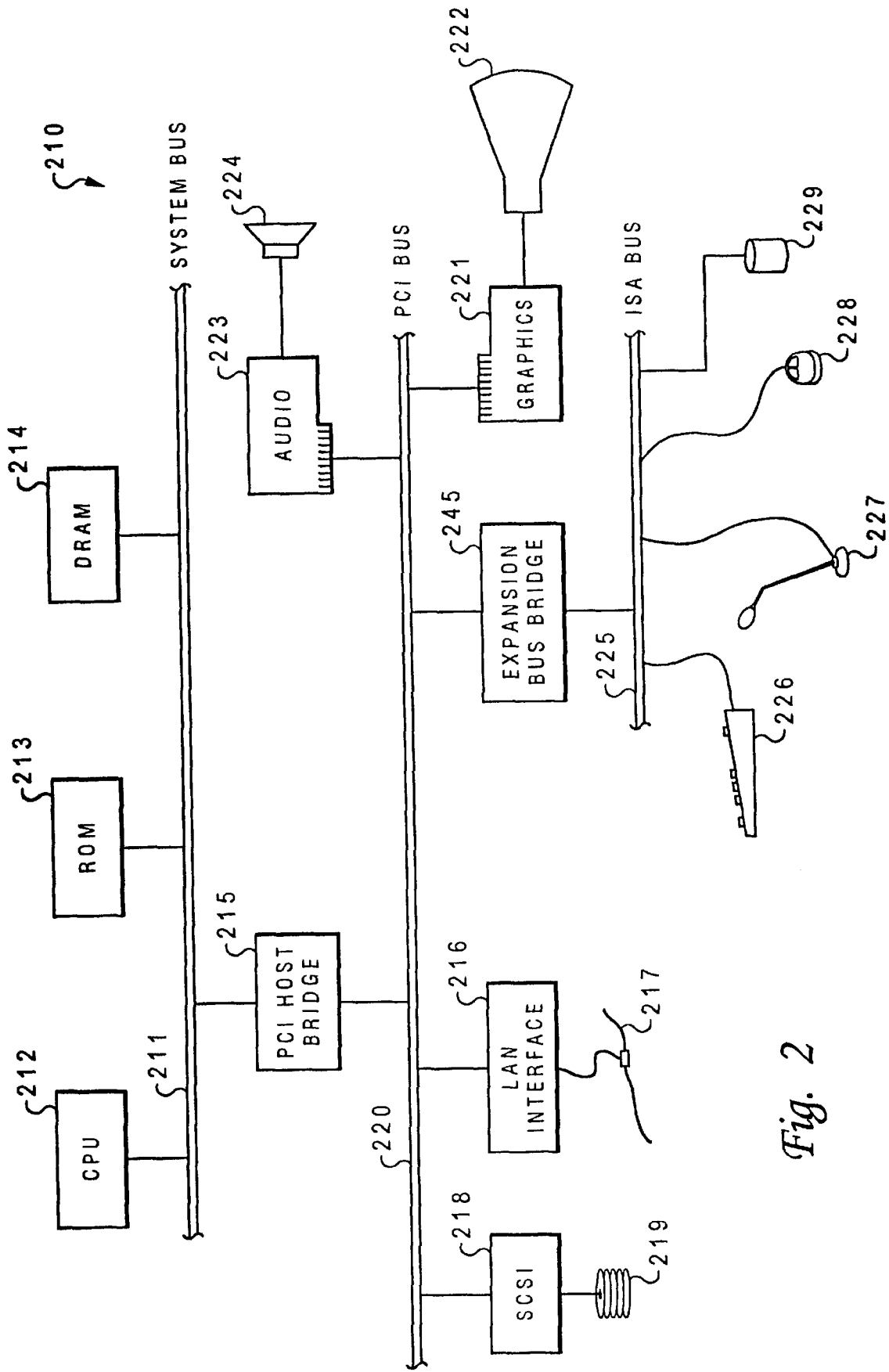
FIG. 2 which is a pictographic representation of one implementation of a PCI bus and associated devices, used to illustrate the components and functions of a PCI bus which perform the function of the general computer bus illustrated in FIG. 1.

Refer now to FIG. 2, which is a graphic representation of a PCI bus and associated devices, used to illustrate the components and functions of a PCI bus which perform the functions of the general computer bus illustrated in FIG. 1. As shown, a central processing unit (CPU) 212, a read-only memory (ROM) 213, and a Dynamic Random Access Memory (DRAM) 214 are connected to a system bus 211 of a computer system 210. CPU 212, ROM 213, and DRAM 214 are also coupled to a PCI local bus 220 of computer system 210 through a PCI host bridge 215. PCI host bridge 215 provides a low latency path through which processor 212 may directly access PCI devices mapped anywhere within bus memory and/or I/O address spaces. PCI host bridge 215 also provides a high bandwidth path for allowing PCI devices to directly access DRAM 214.

Also attached to PCI local bus 220 are LAN interface 216, small computer system interface (SCSI) 218, and expansion bus bridge 245. LAN interface 216 is for connecting computer system 210 to a local-area network 217. SCSI 218 is utilized to control high-speed SCSI disk drive 219. Expansion bus bridge 245, such as a PCI-to-ISA bus bridge, may be utilized for coupling ISA bus 225 to PCI local bus 220. As shown, a keyboard 226, a microphone 227, and a mouse 228 are attached to ISA bus 225 for performing certain basic I/O functions. In addition, an audio adapter 223 is attached to PCI local bus 220 for controlling audio output through speaker 224. A graphics adapter 221 is also attached to PCI local bus 220 for controlling visual output through display monitor 222.

In PCI vernacular, the functions of the link access control station 112 as described in FIG. 1 are performed by what is known as a "PCI host bridge" 215, which contains within it, among other things, the PCI controller referred to above. The PCI host bridge controller performs all the functions of the link access control station 112 as was discussed above, plus an additional function of serving as a "bridge" between the PCI bus 220 itself and computer system bus 211.

A "bridge," is a means that links or routes signals from one bus to another and is a functional unit that interconnects two local area networks (LANs) that use the same logical link control procedure, but may use different medium access control procedures. Weik M., *Communications Standard Dictionary* 94 (3ed. 1996). The bridging function of the PCI host bridge 215 is that, when appropriate, the PCI host bridge 215 serves to link signals from computer system bus 211 to PCI bus 220 and vice versa ordinarily, the buses are not connected to each other, but when appropriate the PCI host bridge serves to establish a "bridge" between the two buses so that data transfer between devices on either bus can occur. This generally amounts to actually establishing an electrical connection between the two buses.

However, even though the buses are not generally (except when a bridging operation is called for) physically connected, insofar as communication over PCI bus 220 is concerned, it appears to all devices that the two buses are interconnected in that all devices use the same logical link control procedure. That is, prior to transmitting over PCI bus 220 all devices first must receive permission to do so from the PCI host bridge controller. The fact that a device is on system bus 211 is transparent to the device when it wishes to transmit on PCI bus 220. From a device standpoint (e.g., CPU 212) a device merely activates its request access to PCI bus signal (e.g., CPU 212's REQ signal). Then, in response to such and in a manner transparent to the device, PCI host bridge 215 via an internal mapping algorithm (the specifics of which are not discussed here) recognizes whether a requesting station needs a bridge between the two buses (e.g., a device on the system bus 211, such as CPU 212, needs to communicate with a device on the PCI bus 220, such as graphics driver 221, or vice versa) or merely needs to broadcast over the PCI bus 220, and the appropriate bridging is effectuated on the basis of the identity of the requesting device and the internal mapping algorithm.

The foregoing has set forth the general features of a PCI bus relevant to the present invention. More specific features of a PCI bus relevant to the invention will be set forth, as necessary, below.

Figure 3A:
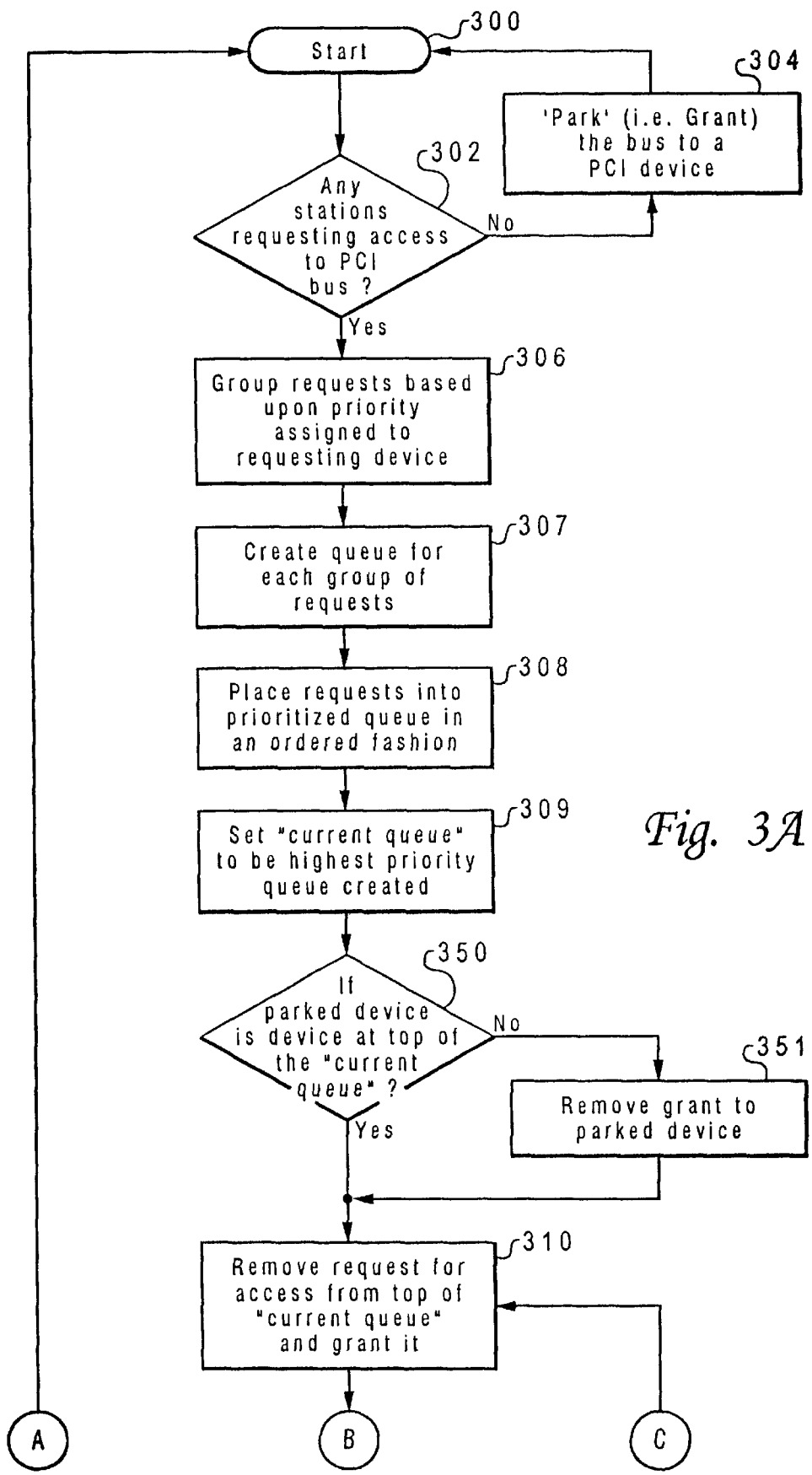
FIGS. 3A, 3B and 3C compose a high-level logic flowchart depicting the method and process of the present invention.
Figure 3B:
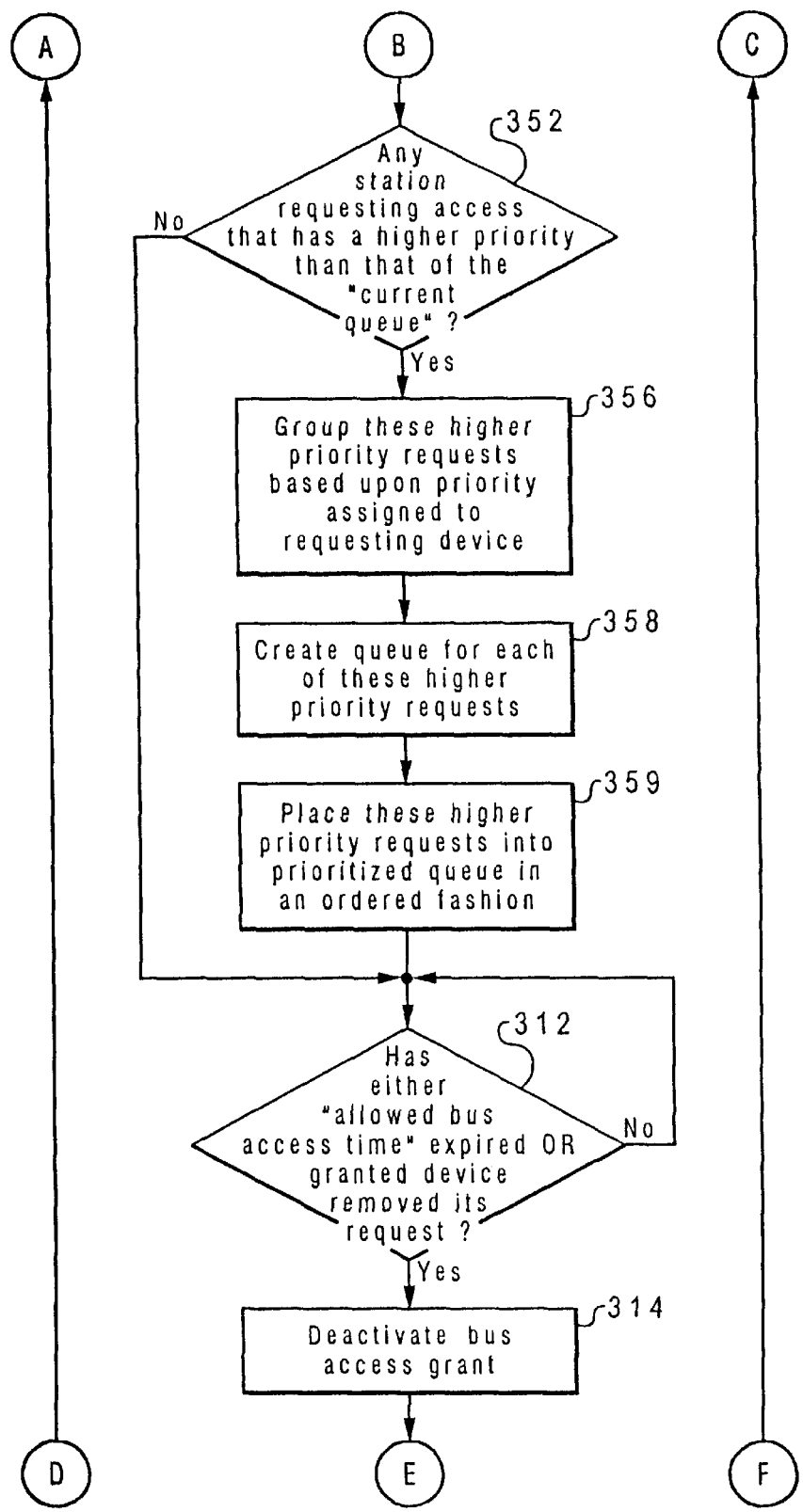
Figure 3C:
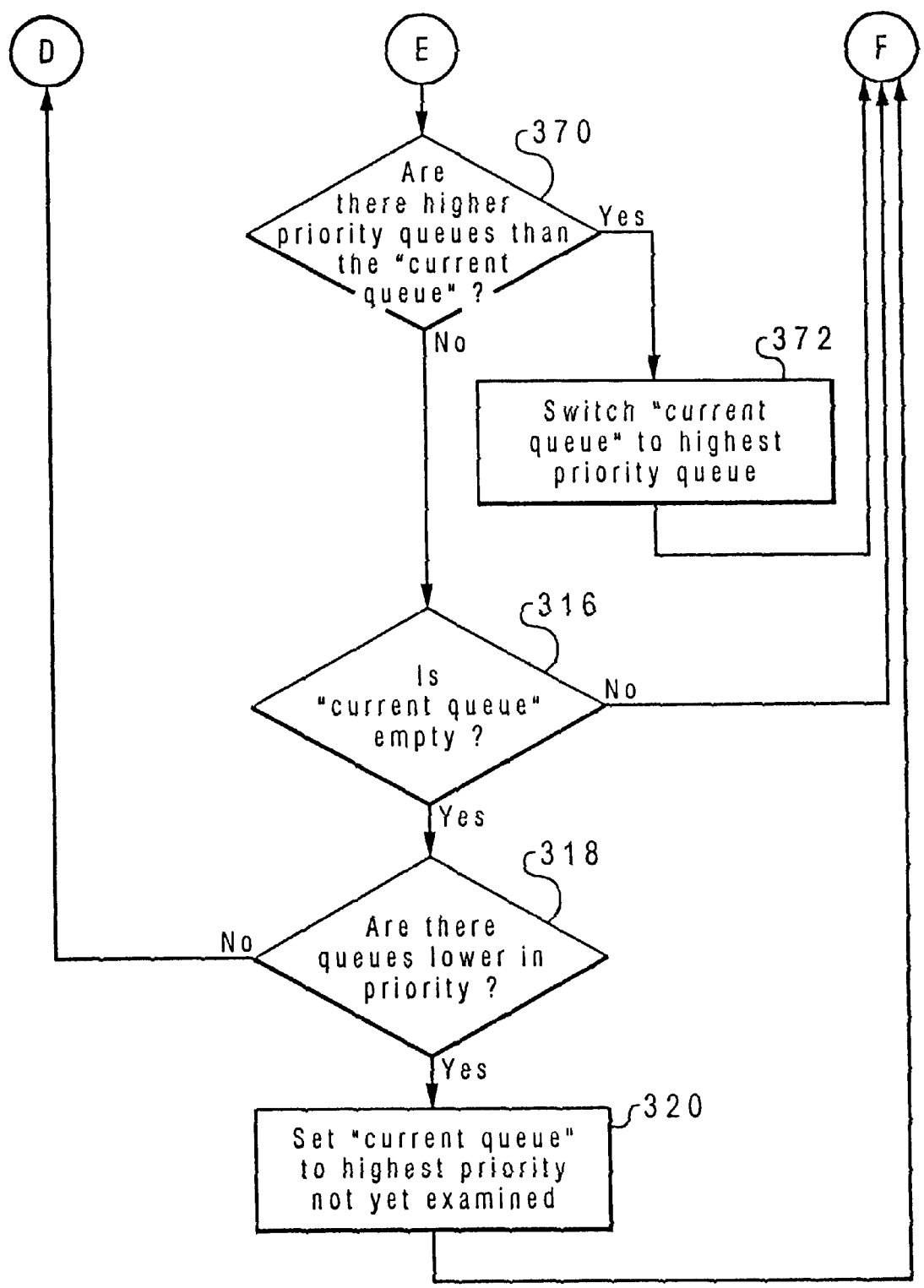

With reference now to FIGS. 3A, 3B and 3C there is depicted a high-level logic flowchart depicting the method and process of the present invention. In the following discussion of FIGS. 3A, 3B and 3C, reference will be made to creating queues and loading such queues. It is to be understood that said creating and loading of queues indicates that such queues are created and loaded at specific instances in time (as such instances in time are defined in FIGS. 3A, 33 and 3C, e.g., as in method steps 307 and 358) and that such queues are not reloaded, nor are additional elements added to such queues until a future instance in time as defined by FIGS. 3A, 33 and 3C, e.g., as in method steps 307 and 358. Furthermore, those skilled in the art will recognize that the steps of creating and loading queues could also refer to a set of pre-existing queues which are loaded at a particular point in time and are not subsequently reloaded until said initial loading has been completely exhausted.

Method step 300 depicts the start of the process. Method step 302 depicts determining if any of the stations attached to a computer bus are requesting access to the computer bus. In the event that no devices are requesting access, the process proceeds to method step 304 wherein the process directs that the PCI bus be "parked" by some selected PCI device. A PCI device knows that it is to park the bus when that device's request granted signal (GNT) is activated without such a device having previously activated its request bus access signal (REQ). (Under PCI bus standards, there is a requirement that when the PCI bus is idle that the PCI bus not be allowed to "float" (i.e., the PCI bus is not left undriven electrically). PCI bus standards ensure that the PCI bus does not float by requiring that some PCI device "park" the bus when no device needs to use the PCI bus. A device "parks" the bus by electrically driving it.) Subsequent to method step 304 the process proceeds to method step 300 and continues from that point.

In the event that the determination shown in method step 302 determined that certain devices were requesting access to a computer bus, the process proceeds to method step 306. Method step 306 sorts (groups) the requests for access to the computer bus based on a priority level (how the priority level is determined will be explained in detail in relation to FIG. 4, below) assigned to each requesting device, with each grouping consisting of all requests from devices of the same priority level. Method step 307 creates queues wherein requests are placed, with each queue being associated with the priorities of the requesting devices in each grouping. That is, if one or more high priority devices are requesting access to a computer bus, then a high priority queue will be created; if one or more medium priority devices are requesting access to a computer bus, then a medium priority queue will be created, and if one or more low priority devices are requesting access to a computer bus, then a low priority queue will be created.

Once such queues have been created, method step 308 depicts that the requests are ordered in the created queues based upon a predetermined ordering scheme (e.g., the devices attached to PCI bus 220 could be numbered 1 through 7, with it being understood that requesting devices are to be arranged in their respective queues in the order from the lowest to the highest numbered).

Method step 309 depicts setting a parameter, "current queue," to be the highest priority queue that was created in method step 307.

Method step 350 shows that in the event that a device previously directed to "park" the PCI bus (e.g., as is done in method step 304) just happens (by chance, since the fact that such a device was first in the "current queue" is completely unrelated to the fact that such a device was previously directed to "park" the bus) to be the device at the top of the "current queue" then there is no need to deactivate the parking device's request granted signal (GNT), since the fact that the parking device appears at the top of the "current queue" indicates that the device is to be given access to the bus. On the other hand, if the device previously directed to "park" the PCI bus does not appear at the top of the "current queue," method step 351 shows that parking device's request granted (GNT) line is deactivated so that the PCI bus is made ready for use.

Method step 310 illustrates removing and granting the request which appears at the top of the "current queue" (once a request has been removed from the queue the next-in-line request within the queue appears at the top).

Method step 352 depicts the inquiry as to whether any station, which has a priority higher than that of the "current queue," is requesting access to the PCI bus. If the inquiry of method step 352 did not indicate that one or more stations, with priorities higher than "current queue" are requesting access to the PCI bus, the process proceeds to method step 312. If the inquiry of method step 352 resulted in a determination that one or more stations, with priorities higher than "current queue" are requesting access to the PCI bus, method step 356 shows that such requests are grouped based upon the priorities assigned to the requesting device in the same way as was explained in relation to method step 306. Method step 358 depicts that a queue is created for each of the higher priority requests (those detected in method step 352, and grouped in method step 356) in the same way as was explained in relation to method step 307. Method step 359 illustrates that the requests detected in method step 352 and grouped in method step 356 are then placed in the queues created in method step 358 in an ordered fashion identical to the way explained in relation to method step 308. After the completion of method step 359 the process proceeds to method step 312.

Method step 312 shows the determination of whether the requesting device has had access to the computer bus for greater than a prespecified (by the programmer) amount of time or whether the requesting device is completing its access, which is indicated by it deactivating its request bus access signal (REQ). If the requesting time exceeds the prespecified time prior to the device relinquishing its access to the computer bus, the process proceeds to method step 314 wherein PCI host bridge deactivates the requesting device's request granted line (GNT), and subsequently proceeds to method step 370. If the requesting device completes its access before the expiration of its allocated time and consequently deactivates its request bus access signal (REQ), the process proceeds to method step 314 wherein PCI host bridge deactivates the requesting device's request granted line (GNT), and subsequently proceeds to method step 370. If neither the requesting time exceeds the prespecified time nor the requesting device deactivates its request bus access signal (REQ), the process stays at method step 312.

Method step 370 illustrates the inquiry as to whether one or more higher priority queues exist than the "current queue." Method step 370 is intended to determine if one or more higher priority queues were created via method steps 352–359, as explained above. In the event that such one or more higher priority queues exist, the process proceeds to method step 372 which shows that "current queue" is switched to the highest priority queue in existence, after which the process proceeds to method step 310 and continues from that point.

In the event that the inquiry illustrated in method step 370 determines that there are no higher priority queues than the "current queue" the process proceeds to method step 316.

Method step 316 depicts an inquiry wherein it is determined if the "current queue" is empty. If the current queue is determined to be empty the process proceeds to method step 318. In the event that the "current queue" is found to be not empty the process proceeds to method step 310 and continues from that point.

Method step 318 determines whether one or more lower in priority queues than the queue just read from (in method steps 312–316) have been created. If no such lower in priority queues have been created, the process proceeds to method step 300 and continues from that point. If method step 318 determines that one or more lower in priority queues than the queue just read from have been created, then method step 320 sets "current queue" to be the highest priority queue of the remaining lower in priority queues that have yet to be examined. Subsequently, the process proceeds to method step 310 and continues from that point.

Figure 4:
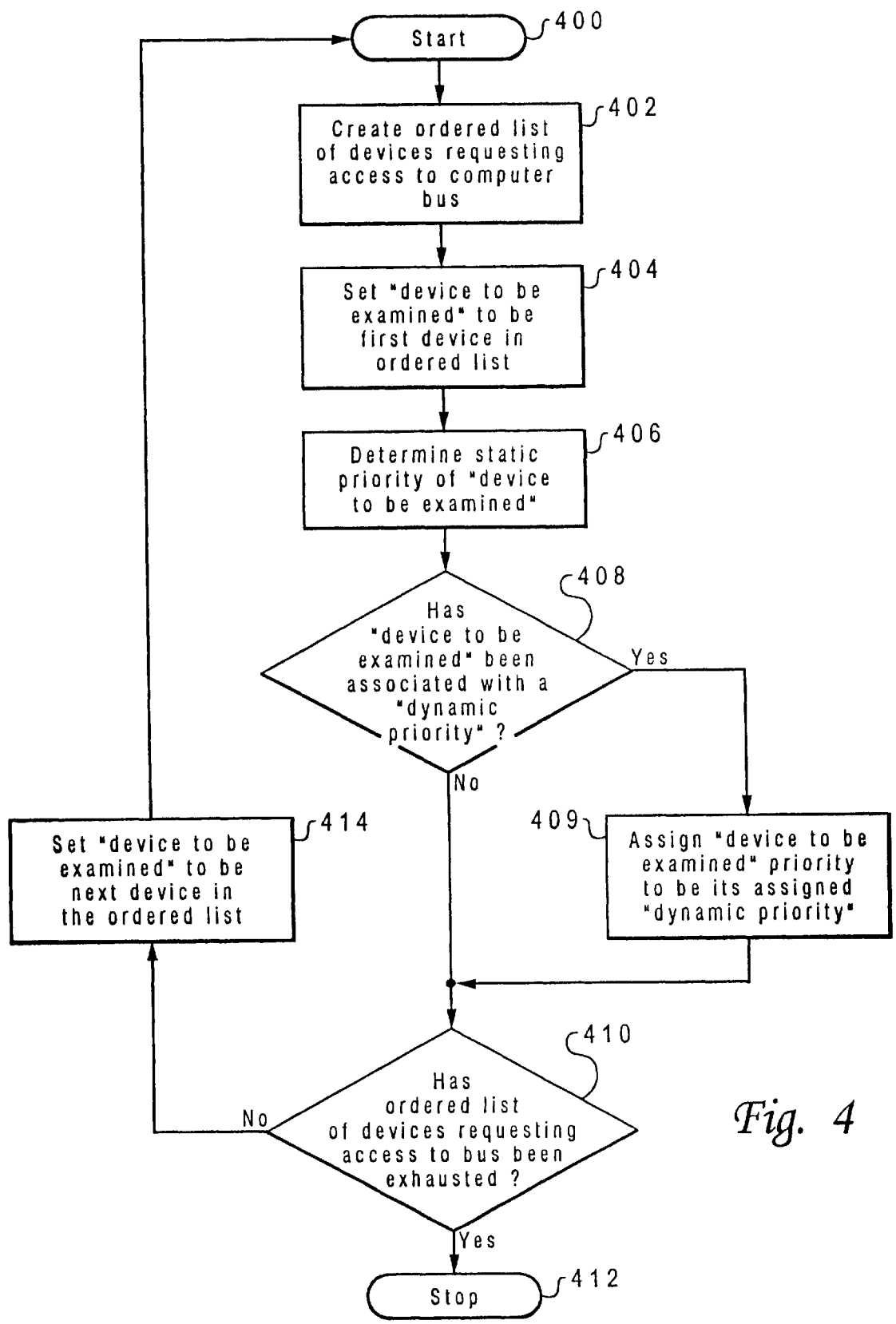
FIG. 4 is a high-level logic flowchart depicting the method and process whereby priorities are determined for differing devices requesting access to a computer bus.

Referring now to FIG. 4, which is a high-level logic flowchart depicting the method and process whereby priorities are determined for the differing devices requesting access to a computer bus. Method step 400 shows the start of the process. Method step 402 illustrates creating an ordered list of the devices which are requesting access to a computer bus with the list ordered from a lowest ordinal number device requesting access to a highest ordinal number device requesting access (it is to be assumed that all devices have pre-assigned ordinal designations). Method step 404 shows setting a "device to be examined" parameter to be the first device in the created ordered list. Method step 406 shows the determination of the "static" (constant) priority associated with the "device to be examined." The "static" priority associated with each device is loaded at configuration time. Method step 408 depicts the determination of whether a "dynamic" priority has been associated with the "device to be examined." A "dynamic" priority is a priority that has previously been associated with a requesting device by the PC host bridge, and is essentially a temporary change in priority level (a representative example of such an change will be given below in relation to FIG. 5). If method step 408 determines that a "dynamic" priority is associated with the "device to be examined," then method step 409 shows that the device is assigned its "dynamic" priority in place of its static priority, and such "dynamic" priority is used to determine which queue the request from a specific device is to be placed in. Method step 410 depicts the determination of whether the ordered list of requesting devices has been exhausted (i.e., the priorities of all requesting devices have been determined). If the ordered list has been exhausted (i.e., all priorities have been determined), the process proceeds to method step 412 and stops. If the ordered list has not been exhausted (i.e., all requesting device priorities have not been determined), method step 414 shows that the parameter "device to be examined" is set to be the next device in the ordered list, and that subsequently the process proceeds to method step 400 and proceeds from that point.

Figure 5:
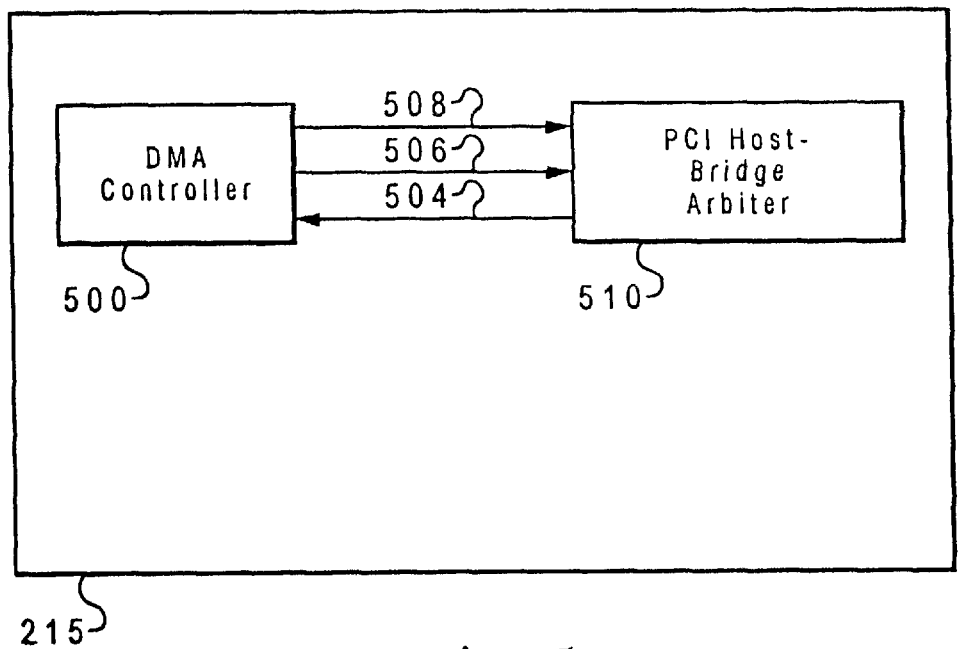
FIG. 5 which is a partially schematic representation of one manner in which a requesting device is assigned an ugraded "dynamic" priority by the present invention.

Refer now to FIG. 5, which is a partially schematic representation of one manner in which a requesting device is assigned a temporary "dynamic" priority (which can either be a higher priority for faster servicing, or an "ignore" priority which will result in a device's request being ignored) by the present invention. Illustrated in FIG. 5 is a way in which the preferred embodiment assigns a "dynamic" priority on the basis of the DMA (direct memory access) Delayed Read Completion operation of a PCI bus. Shown is an partially exploded view of PCI host bridge 215 of FIG. 2, wherein is encompassed a PCI host-bridge arbiter 510 as well as a DMA controller 500. DMA controller 500 is a feature of PCI well known in the art, and generally consists of one or more channels whereby Direct Memory Access is allowed to certain memory devices on system bus 211 of FIG. 2. In ordinary operation, DMA controller 500 queries the appropriate memory device on system bus 211 of FIG. 2 when a Direct Memory Access command appears on the PCI bus.

At this point, it is helpful to identify, on a conceptual level, what a DMA Delayed Read Completion transaction is. The PCI 2.1 spec defines the concept of a DMA Delay Read Completion transaction to control bus efficiency. It basically states that when a target of a read access knows that it can't produce the requested data in a given amount of sending s target replies to the sending station with a response that the sending station RETRY later (in the interim, the device goes on to try to retrieve the requested data). When the sending station (often called the "master" station in PCI parlance) receives such a message, it relinquishes the PCI bus and informs the PCI host-bridge arbiter 510 that it no longer needs access to the bus by disabling its bus access request signal (REQ). Ordinarily, the sending station thereafter, at varying points in time, requests access to the bus, and when PCI host-bridge arbiter 510 grants access to the bus, the sending station again sends a message to the target station requesting the data. Again, if the data is not ready, the sending station is told to "retry" the target (receiving) station later. In the ordinary scheme of things under the PCI standard, the sending station has no idea of when the receiving device will be ready, and thus blindly sends requests for PCI bus access, which often results in wasted bandwidth when the receiving (target) station still has not retrieved the necessary data.

The preferred embodiment does away with this wasted bandwidth in that it presents a scheme whereby the PCI host-bridge arbiter 510 will not grant the sending station's subsequent requests for access to the PCI bus until PCI host-bridge arbiter 510 receives notification from DMA controller 500 that the data has been retrieved.

In the preferred embodiment, DMA controller 500 has been modified such that when DMA controller 500 detects that a master attempting a Direct Memory Access has received a RETRY message (meaning that the DMA controller 500 cannot deliver the requested data in a certain predetermined minimum amount of time, and thus that the sending station should RETRY to access the data later) from DMA controller 500, DMA controller 500 immediately contacts PCI host-bridge arbiter 510 and informs PCI host-bridge arbiter 510 that the sending station's request for bus access (REQ) should be ignored until DMA controller 500 informs PCI host-bridge arbiter 510 otherwise in the fashion now explained.

In the preferred embodiment, when a DMA command appears on the PCI bus, PCI host-bridge arbiter 510 immediately makes DMA controller 500 aware of the identity of the device requesting DMA via "identity (e.g., device number) of sending station" 504. Thereafter, should DMA controller 500 detect that a master attempting a Direct Memory Access has received a RETRY message (meaning that the DMA controller 500 cannot deliver the requested data in a certain predetermined minimum amount of time, and thus that the sending station should RETRY to access the data later) from DMA controller 500, DMA controller 500 immediately contacts PCI host-bridge arbiter 510 and DMA controller 500 directs PCI host-bridge arbiter 510 to "ignore transmit request from sending station (i.e., from the device which just received the DMA RETRY message) until further notice" 506.

In response to "ignore transmit request from sending station (i.e., from the device which just received the DMA RETRY message) until further notice" 506 PCI host-bridge arbiter 510 will assign a "dynamic priority" of "ignore" to such sending station, which will cause any subsequent request for PCI bus access from such sending station to be ignored, this operation is logically equivalent to the masking of subsequent requests from the sending station which just received the DMA RETRY message.

When DMA controller 500 becomes aware that the data is now available for a target device from which the earlier request for DMA had been made, but denied via the RETRY message, then DMA controller 500 will direct PCI host bridge arbiter 510 to pay attention to the next request for PCI bus access by that sending station which originally requested the data from the target station via "pay attention to sending station's next request for access" 508.

In response to "pay attention to sending station's next request for access" 508, PCI host bridge arbiter 510 assigns the sending station a "dynamic" priority of "higher than static priority," with such "dynamic" priority continuing until the sending station is serviced (allowed access to the PCI bus) and the pending DMA operation completed.

Figure 6:
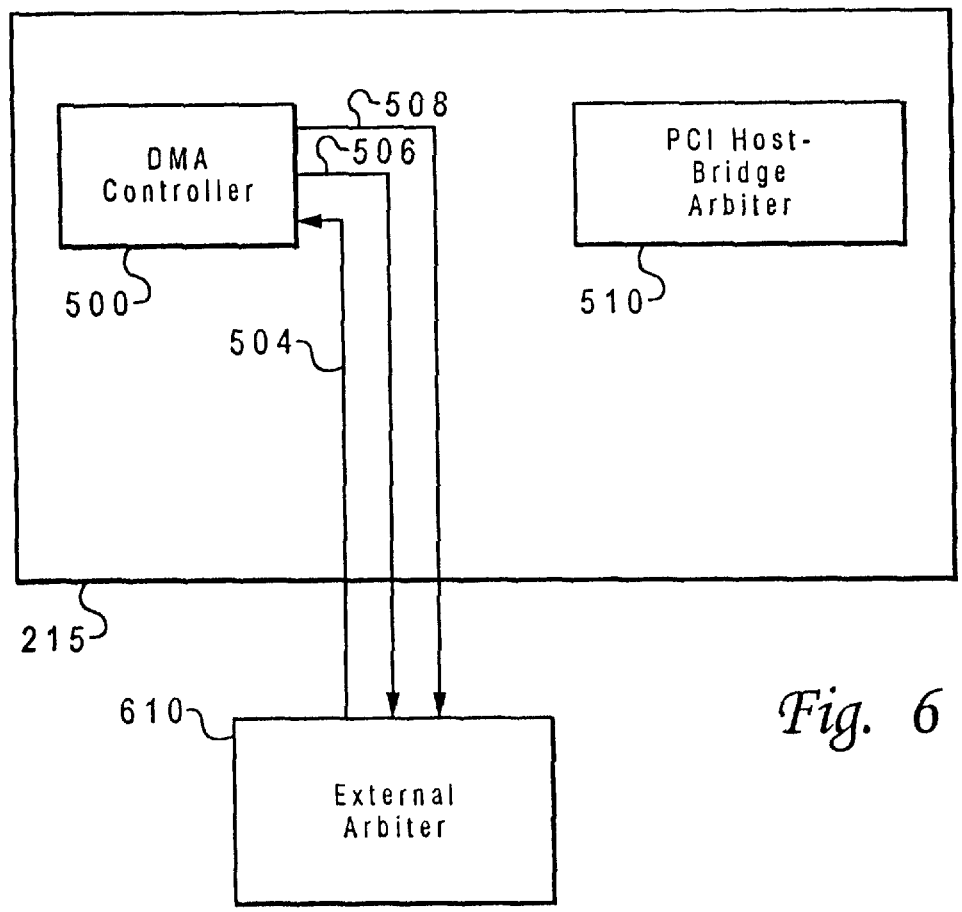
FIG. 6 illustrates the employment of an external arbiter.

FIG. 6 illustrates the employment of an external arbiter 610. The foregoing example has described a situation where the arbiter was internal to the PCI host-bridge 215. Those skilled in the art will recognize that the functions performed by PCI host bridge arbiter 510 could just as easily have been performed by an arbiter external to PCI host-bridge 215, where such external arbiter could then be adjusted for any idiosyncracies of a particular system. The referenced components of FIG. 6 function exactly as the like referenced components of FIG. 5, except that the functions of PCI Host Bridge Arbiter 510 are now performed by external arbiter 610.

Figure 7:
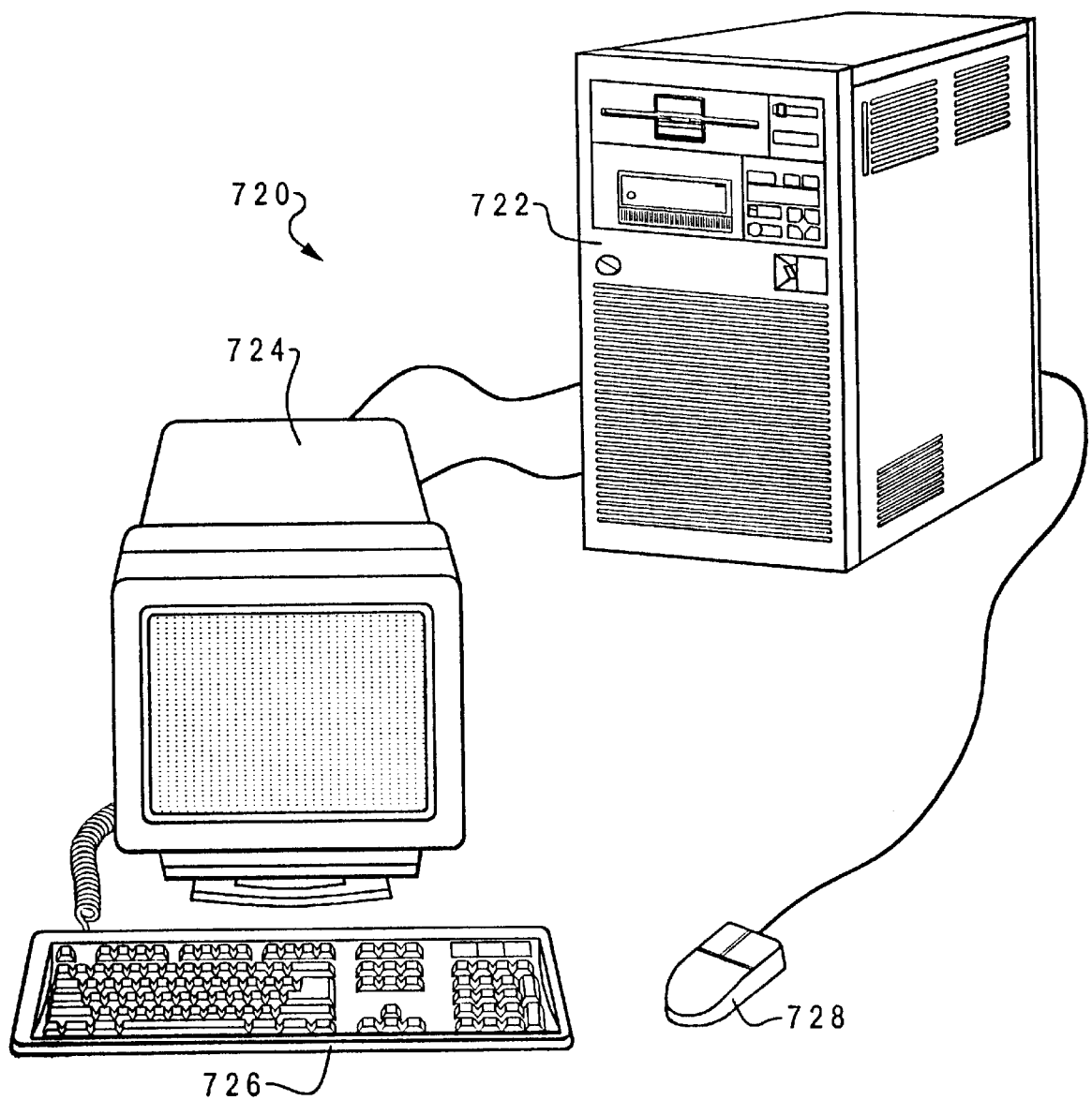
FIG. 7 depicts a pictorial representation of a data-processing system which can be utilized in accordance with the method and system of an illustrative embodiment of the present invention.

With reference now to the figures and in particular with reference now to FIG. 7, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 7. A computer 720 is depicted which includes a system unit 722, a video display terminal 724, a keyboard 726, and a mouse 728. Computer 720 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 8:
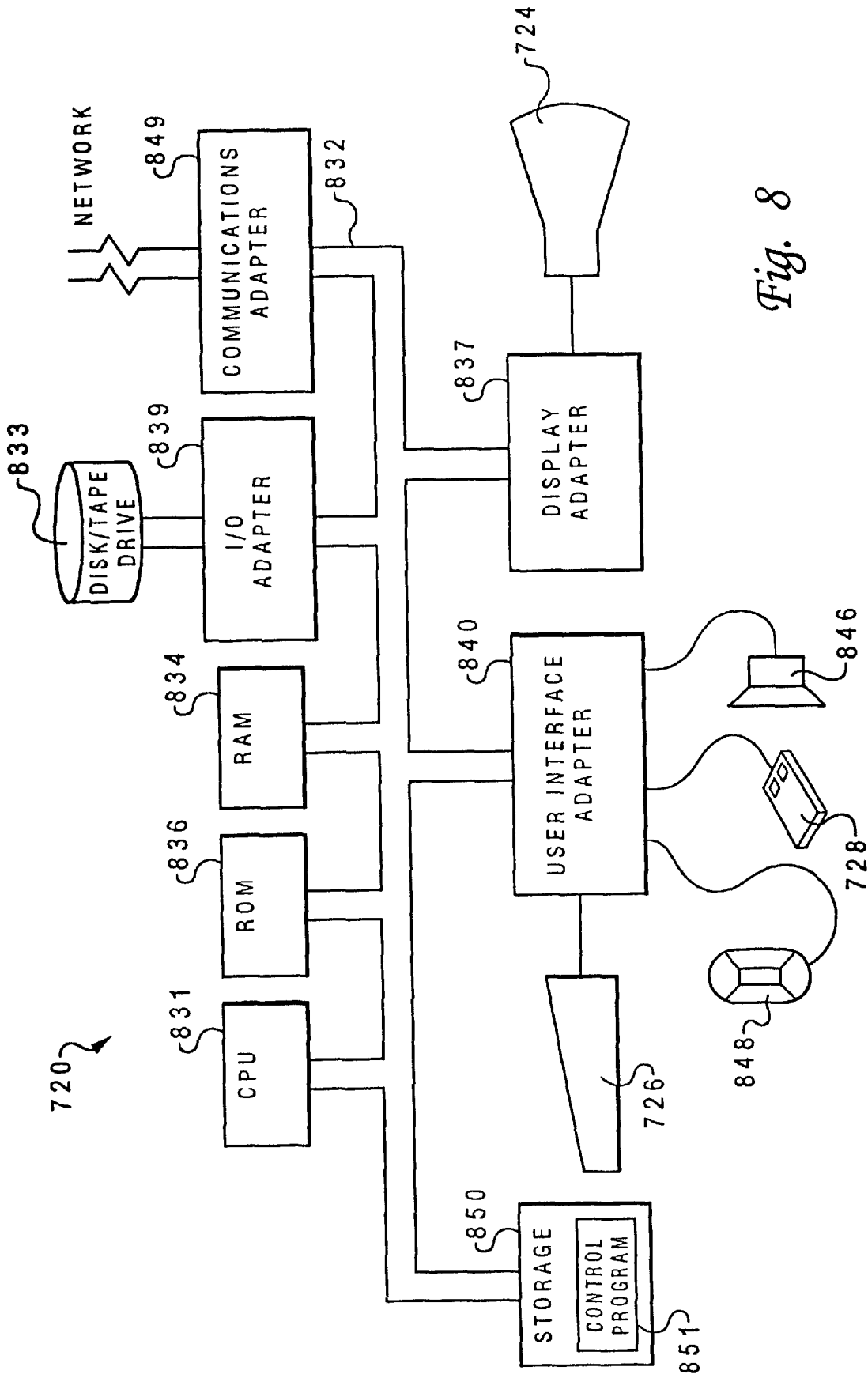
FIG. 8 is an illustration of a representative hardware environment which can be utilized in accordance with the method and system of an illustrative embodiment of the present invention.

FIG. 8 is an illustration of a representative hardware environment which can be utilized in accordance with the method and system of an illustrative embodiment of the present invention. FIG. 8 depicts selected components in computer 720 in which an illustrative embodiment of the present invention may be implemented. System unit 722 includes a Central Processing Unit ("CPU") 831, such as a conventional microprocessor, and a number of other units interconnected via system bus 832. Computer 720 includes random-access memory ("RAM") 834, read-only memory ("ROM") 836, display adapter 837 for connecting system bus 832 to video display terminal 724, and I/O adapter 839 for connecting peripheral devices (e.g., disk and tape drives 833) to system bus 832. Video display terminal 724 is the visual output of computer 720, which can be a CRT-based video display well-known in the art of computer hardware. However, with a portable or notebook-based computer, video display terminal 724 can be replaced with an LCD-based or a gas plasma-based flat-panel display. Computer 720 further includes user interface adapter 840 for connecting keyboard 726, mouse 728, speaker 846, microphone 848, and/or other user interface devices, such as a touch screen device (not shown), to system bus 832. Communications adapter 849 connects computer 720 to a data-processing network.

Any suitable machine-readable media may retain the method and system of an illustrative embodiment of the present invention, such as RAM 834, ROM 836, a magnetic diskette, magnetic tape, or optical disk (the last three being located in disk and tape drives 833). Any suitable operating system and associated graphical user interface (e.g., Microsoft Windows) may direct CPU 831. For example, the AIX operating system and AIXwindows windowing system (i.e., graphical user interface) can direct CPU 831. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 831, such as touch-screen technology or human voice control. In addition, computer 720 includes a control program 851 which resides within computer storage 850. Control program 851 contains instructions that when executed on CPU 831 carries out the operations depicted in the logic flowcharts of FIGS. 3A, 3B, 3C, 4, and 5 and the partially schematic diagrams of FIGS. 5 and 6 as described herein.

Those skilled in the art will appreciate that the hardware depicted in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for allowing one or more attached devices to access a computer bus, said method comprising the steps of:

in response to one or more devices requesting access to said computer bus at a particular instant in time, loading one or more prioritized queues with one or more requests for access from one or more devices whose assigned priority levels correspond to a priority of a queue into which said requests for access are loaded; and preferentially granting in a sequential fashion those requests for access which are resident within a current queue until said current queue is empty, and thereafter granting at least one request for access from a lower in priority queue relative to said current queue before responding to other requests for access such that at least one request for access is periodically granted from a lower in priority queue relative to said current queue.

2. The method of claim 1, further comprising the steps of:

in response to one or more devices with assigned priorities higher than said current queue and whose requests for access have not previously been enqueued, requesting access to said computer bus, loading one or more prioritized queues with one or more requests for access from said one or more devices whose assigned priority levels are higher than said current queue and whose requests for access have not previously been enqueued with said loading done in such a fashion that the priorities of said one or more requests for access from said one or more devices whose assigned priority levels are higher than said current queue correspond to the queue into which said requests for access are loaded;

resetting said current queue to a highest priority non-empty queue; and thereafter, returning to said preferentially granting step.

3. The method of claim 2, wherein said loading one or more prioritized queues with one or more requests for access from said one or more devices whose assigned priority levels are higher than said current queue and whose requests for access have not previously been enqueued step further comprises the steps of:

in response to one or more devices, whose requests for access have not previously been enqueued, requesting access to said computer bus at another particular instance in time, creating a new queue for each discrete level of said priority levels that have been assigned to said devices whose requests for access have not been enqueued and are higher in priority than said current queue; and placing, in an ordered fashion, said requests for access from said devices whose requests have not previously been enqueued into said created new queues with priority levels correspondent to said priority levels assigned to said devices whose requests have not been previously enqueued.

4. The method of claim 3 wherein said creating a new queue for each discrete level of said priority levels that have been assigned to said devices whose requests for access have not been enqueued step further comprises the steps of:

in response to one or more devices, whose requests for access have not previously been enqueued, requesting access to said computer bus at another particular instance in time, assigning a priority level to each of said one or more devices whose requests for access have not previously been enqueued; and in response to said assigning step, creating a queue for each discrete level of said assigned priorities which is present within the priorities assigned to each of said one or more devices requesting access.

5. The method of claim 4, wherein said assigning a priority level step further comprises the steps of:

assigning a static priority level to each of said one or more devices requesting access;

in response to a device from which data is requested being unable to satisfy said request for data within a pre-specified time, temporarily assigning a dynamic priority of ignore to said device making said request for data; and in response to a device which was previously assigned a priority of ignore subsequently becoming able to satisfy a request for data which caused said device to be assigned a priority of ignore, temporarily assigning a high priority to said device which was previously assigned a priority of ignore.

6. The method of claim 1, wherein said loading one or more prioritized queues with one or more requests for accesses from one or more devices whose assigned priority levels correspond to a priority of a queue into which said requests for access are loaded step further comprises the steps of:

creating a queue for each discrete level of priority which is present within the priorities assigned to each of said one or more devices requesting access; and placing, in an ordered fashion, requests for access from said one or more devices in queues correspondent to said one or more devices' assigned priority levels.

7. The method of claim 6 wherein said creating a queue for each discrete level of priority which is present within the priorities assigned to each of said one or more devices requesting access step further comprises the steps of:

in response to one or more devices requesting access to said computer bus at a particular instance in time, assigning a priority level to each of said one or more devices requesting access to said computer bus; and in response to said assigning step, creating a queue for each discrete level of said assigned priorities which is present within the priorities assigned to each of said one or more devices requesting access.

8. The method of claim 7, wherein said assigning a priority level step further comprises the steps of:

assigning a static priority level to each of said one or more devices requesting access;

in response to a device from which data is requested being unable to satisfy said request for data within a pre-specified time, temporarily assigning a dynamic priority of ignore to said device making said request for data; and in response to a device which was previously assigned a priority of ignore subsequently becoming able to satisfy a request for data which caused said device to be assigned a priority of ignore, temporarily assigning a high priority to said device which was previously assigned a priority of ignore.

9. The method of claim 1, wherein said preferentially granting step further comprises the steps of:

granting in a sequential fashion those requests for access which are resident within a current queue until said current queue is empty; and if non-empty queues exist that are lower in priority than said current queue, granting a previously ungranted request for access which is resident within a non-empty queue that is lower in priority than said current queue.

10. An apparatus for allowing one or more attached devices to access a computer bus, said apparatus comprising:

means, responsive to one or more devices requesting access to said computer bus at a particular instant in time, for loading one or more prioritized queues with one or more requests for access from one or more devices whose assigned priority levels correspond to a priority of a queue into which said requests for access are loaded; and means for preferentially granting in a sequential fashion those requests for access which are resident within a current queue until said current queue is empty, and thereafter granting at least one request for access from a lower in priority queue relative to said current queue before responding to other requests for access such that at least one request for access is periodically granted from a lower in priority queue relative to said current queue.

11. The apparatus of claim 10, further comprising:

means, responsive to one or more devices with assigned priorities higher than said current queue and whose requests for access have not previously been enqueued, for requesting access to said computer bus, for loading one or more prioritized queues with one or more requests for access from said one or more devices whose assigned priority levels are higher than said current queue and whose requests for access have not previously been enqueued with said loading done in such a fashion that the priorities of said one or more requests for access from said one or more devices whose assigned priority levels are higher than said current queue correspond to the queue into which said requests for access are loaded;

means for resetting said current queue to a highest priority non-empty queue; and means for, thereafter, returning to said means for preferentially granting.

12. The apparatus of claim 11, wherein said means for loading one or more prioritized queues with one or more requests for access from said one or more devices whose assigned priority levels are higher than said current queue and whose requests for access have not previously been enqueued further comprises:

means, responsive to one or more devices, whose requests for access have not previously been enqueued, requesting access to said computer bus at another particular instance in time, for creating a new queue for each discrete level of said priority levels that have been assigned to said devices whose requests for access have not been enqueued and are higher in priority than said current queue; and means for placing, in an ordered fashion, said requests for access from said devices whose requests have not previously been enqueued into said created new queues with priority levels correspondent to said priority levels assigned to said devices whose requests have not been previously enqueued.

13. The apparatus of claim 12 wherein said means for creating a new queue for each discrete level of said priority levels that have been assigned to said devices whose requests for access have not been enqueued further comprises:

means, responsive to one or more devices, whose requests for access have not previously been enqueued, requesting access to said computer bus at another particular instance in time, for assigning a priority level to each of said one or more devices whose requests for access have not previously been enqueued; and means, responsive to means for assigning, for creating a queue for each discrete level of said assigned priorities which is present within the priorities assigned to each of said one or more devices requesting access.

14. The apparatus of claim 13, wherein said means for assigning a priority level further comprises:

means for assigning a static priority level to each of said one or more devices requesting access;

means, responsive to a device from which data is requested being unable to satisfy said request for data within a prespecified time, for temporarily assigning a dynamic priority of ignore to said device making said request for data; and means, responsive to a device which was previously assigned a priority of ignore subsequently becoming able to satisfy a request for data which caused said device to be assigned a priority of ignore, for temporarily assigning a high priority to said device which was previously assigned a priority of ignore.

15. The apparatus of claim 10, wherein said means for loading one or more prioritized queues with one or more requests for accesses from one or more devices whose assigned priority levels correspond to a priority of a queue into which said requests for access are loaded further comprises:

means for creating a queue for each discrete level of priority which is present within the priorities assigned to each of said one or more devices requesting access; and means for placing, in an ordered fashion, requests for access from said one or more devices in queues correspondent to said one or more devices' assigned priority levels.

16. The apparatus of claim 15 wherein said means for creating a queue for each discrete level of priority which is present within the priorities assigned to each of said one or more devices requesting access further comprises:

means, responsive to one or more devices requesting access to said computer bus at a particular instance in time, for assigning a priority level to each of said one or more devices requesting access to said computer bus; and means, responsive to said assigning, for creating a queue for each discrete level of said assigned priorities which is present within the priorities assigned to each of said one or more devices requesting access.

17. The apparatus of claim 16, wherein said means for assigning a priority level further comprises:

means for assigning a static priority level to each of said one or more devices requesting access;

means, responsive to a device from which data is requested being unable to satisfy said request for data within a prespecified time, for temporarily assigning a dynamic priority of ignore to said device making said request for data; and means, responsive to a device which was previously assigned a priority of ignore subsequently becoming able to satisfy a request for data which caused said device to be assigned a priority of ignore, for temporarily assigning a high priority to said device which was previously assigned a priority of ignore.

18. The apparatus of claim 10, wherein said means for preferentially granting further comprises:

means for granting in a sequential fashion those requests for access which are resident within a current queue until said current queue is empty; and means for, if non-empty queues exist that are lower in priority than said current queue, granting a previously ungranted request for access which is resident within a non-empty queue that is lower in priority than said current queue.

19. A program product for a computer system for allowing one or more attached devices to access a computer bus, said program product comprising:

means, responsive to one or more devices requesting access to said computer bus at a particular instant in time, for loading one or more prioritized queues with one or more requests for access from one or more devices whose assigned priority levels correspond to a priority of a queue into which said requests for access are loaded;

means for preferentially granting in a sequential fashion those requests for access which are resident within a current queue until said current queue is empty, and thereafter granting at least one request for access from a lower in priority queue relative to said current queue before responding to other requests for access such that at least one request for access is periodically granted from a lower in priority queue relative to said current queue; and signal bearing media bearing said means for loading, and means for preferentially granting.

20. The program product of claim 19 wherein said signal bearing media comprises recordable media.

21. The program product of claim 19 wherein said signal bearing media comprises transmission media.

22. The program product of claim 19, further comprising:

means, responsive to one or more devices with assigned priorities higher than said current queue and whose requests for access have not previously been enqueued, for requesting access to said computer bus, for loading one or more prioritized queues with one or more requests for access from said one or more devices whose assigned priority levels are higher than said current queue and whose requests for access have not previously been enqueued with said loading done in such a fashion that the priorities of said one or more requests for access from said one or more devices whose assigned priority levels are higher than said current queue correspond to the queue into which said requests for access are loaded;

means for resetting said current queue to a highest priority non-empty queue; and means for, thereafter, returning to said means for preferentially granting.

23. The program product of claim 22, wherein said means for loading one or more prioritized queues with one or more requests for access from said one or more devices whose assigned priority levels are higher than said current queue and whose requests for access have not previously been enqueued further comprises:

means, responsive to one or more devices, whose requests for access have not previously been enqueued, requesting access to said computer bus at another particular instance in time, for creating a new queue for each discrete level of said priority levels that have been assigned to said devices whose requests for access have not been enqueued and are higher in priority than said current queue; and means for placing, in an ordered fashion, said requests for access from said devices whose requests have not previously been enqueued into said created new queues with priority levels correspondent to said priority levels assigned to said devices whose requests have not been previously enqueued.

24. The program product of claim 23 wherein said means for creating a new queue for each discrete level of said priority levels that have been assigned to said devices whose requests for access have not been enqueued further comprises:

means, responsive to one or more devices, whose requests for access have not previously been enqueued, requesting access to said computer bus at another particular instance in time, for assigning a priority level to each of said one or more devices whose requests for access have not previously been enqueued; and means, responsive to means for assigning, for creating a queue for each discrete level of said assigned priorities which is present within the priorities assigned to each of said one or more devices requesting access.

25. The program product of claim 24, wherein said means for assigning a priority level further comprises:

means for assigning a static priority level to each of said one or more devices requesting access;

means, responsive to a device from which data is requested being unable to satisfy said request for data within a prespecified time, for temporarily assigning a dynamic priority of ignore to said device making said request for data; and means, responsive to a device which was previously assigned a priority of ignore subsequently becoming able to satisfy a request for data which caused said device to be assigned a priority of ignore, for temporarily assigning a high priority to said device which was previously assigned a priority of ignore.

26. The program product of claim 19, wherein said means for loading one or more prioritized queues with one or more requests for accesses from one or more devices whose assigned priority levels correspond to a priority of a queue into which said requests for access are loaded further comprises:

means for creating a queue for each discrete level of priority which is present within the priorities assigned to each of said one or more devices requesting access; and means for placing, in an ordered fashion, requests for access from said one or more devices in queues correspondent to said one or more devices' assigned priority levels.

27. The program product of claim 26 wherein said means for creating a queue for each discrete level of priority which is present within the priorities assigned to each of said one or more devices requesting access further comprises:

means, responsive to one or more devices requesting access to said computer bus at a particular instance in time, for assigning a priority level to each of said one or more devices requesting access to said computer bus; and means, responsive to said assigning, for creating a queue for each discrete level of said assigned priorities which is present within the priorities assigned to each of said one or more devices requesting access.

28. The program product of claim 27, wherein said means for assigning a priority level further comprises:

means for assigning a static priority level to each of said one or more devices requesting access;

means, responsive to a device from which data is requested being unable to satisfy said request for data within a prespecified time, for temporarily assigning a dynamic priority of ignore to said device making said request for data; and means, responsive to a device which was previously assigned a priority of ignore subsequently becoming able to satisfy a request for data which caused said device to be assigned a priority of ignore, for temporarily assigning a high priority to said device which was previously assigned a priority of ignore.

29. The program product of claim 19, wherein said means for preferentially granting further comprises:

means for granting in a sequential fashion those requests for access which are resident within a current queue until said current queue is empty; and means for, if non-empty queues exist that are lower in priority than said current queue, granting a previously ungranted request for access which is resident within a non-empty queue that is lower in priority than said current queue.

\* \* \* \* \*